United States Patent Office 3,549,592
Patented Dec. 22, 1970

3,549,592
CURING EPOXY RESINS WITH AMIDINES
Norman Bell Godfrey and Heinz Schulze, Austin, Tex., assignors to Jefferson Chemical Company, Inc., Houston, Tex., a corporation of Delaware
No Drawing. Filed Aug. 5, 1968, Ser. No. 750,008
Int. Cl. C08g 30/16
U.S. Cl. 260—47
10 Claims

ABSTRACT OF THE DISCLOSURE

Epoxy resins, cured in the presence of (1) cyclic amidines of the formula:

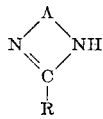

wherein R is hydrogen, alkyl, aryl, aralkyl, alkaryl, or cycloalkyl and A is an alkylene group completing a five or six-membered ring and (2) polyoxyalkylenepolyamines, have improved physical properties and give fast and efficient cures.

BACKGROUND OF THE INVENTION

Field of the invention

The invention pertains to curing epoxy resins. The cured epoxy resin compositions of this invention are useful as coatings, castings, sealants, and adhesives.

Description of the prior art

Polyoxyalkylenepolyamines are known curing agents for epoxy resins. However, epoxy resin compositions containing polyoxyalkylenepolyamines alone as the curing agent require long curing times. By using a cyclic amidine as a co-curing agent with a polyoxyalkylenepolyamine, curing times are reduced to 0.1 to 0.2 the time required when polyoxyalkylenepolyamines are used alone with an epoxy resin. Lee and Neville, Handbook of Epoxy Resins, pages 10–5, teach that amino substituted imidazolines and diimidazolines are curing agents for epoxy resins. The imidazolines useful in our invention are not amino substituted. Cyclic amidines of our invention are not suitable as the sole curing agent for epoxy resins because such resin compositions cure too fast and are overcured.

SUMMARY OF THE INVENTION

Curable epoxy resins, cured in the presence of (1) cyclic amidines of the formula:

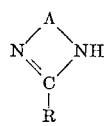

where R is hydrogen, alkyl of 1 to 20 carbon atoms, aryl, aralkyl, alkaryl, or cycloalkyl of 3 to 8 carbon atoms and A is an alkyl substituted or unsubstituted alkylene group completing a five or six-membered ring and (2) polyoxyalkylenepolyamines, are resins of exceptional strength and give fast and efficient cures.

DESCRIPTION OF THE PREFERRED EMBODIMENTS

The invention is applicable to curable epoxy resins. The resins to which this invention is applicable are those polyepoxide organic compounds having an epoxy equivalency of greater than one, that is, compounds having an average of more than one epoxy group; i.e., more than one

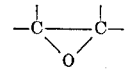

per molecule. These compounds, wherein the oxygen of the epoxy group is attached to vicinal carbon atoms, can be saturated or unsaturated, aliphatic, or cycloaliphatic, and can be substituted with substituents such as halogen atoms, alkyl groups, ether groups and the like. The polyepoxide in the table, below, is the diglycidyl ether of 4,4'-isopropylidenediphenol containing a minor amount of congeneric materials of higher molecular weight and having an epoxy equivalent weight (grams of resin containing one equivalent epoxide) of approximately 190.

The invention is applicable to curable epoxy resin compositions containing a polyoxyalkylenepolyamine. Polyoxyalkylenepolyamines of the formula $R[(OA)_xNH_2]_y$, where R is a hydrocarbon radical, A is an alkylene radical of from 2 to 4 carbon atoms, $x$ has an average value from 1 to 10, and $y$ is an integer from 2 to 4, are useful in the practice of our invention. Polyoxypropylenepolyamines having a molecular weight of 190 to 1,000 are preferred for this invention. For example, epoxy resin compositions containing polyoxypropylenediamine of the formula:

$$H_2N\left(\begin{array}{c}CH_3\\|\\CH-CH_2O\end{array}\right)_n CH_2-\begin{array}{c}CH_3\\|\\CH\end{array}-NH_2$$

where $n$ is 2.4–2.6, 5.58, 15.91 and 33.13 are improved with our invention. The invention is useful with epoxy resin compositions containing tripropyleneglycoldiamine of the formula:

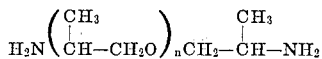

tetrapropyleneglycoldiamine of the formula:

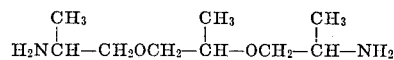

and polyoxypropylenetriamine of the formula:

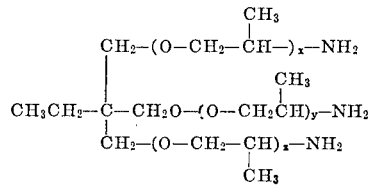

where $x+y+z=5.3$.

The number following the name of a polyoxyalkylenepolyamine represents the approximate molecular weight. The invention is also useful with epoxy resins containing glycol polyamines prepared by cyanoalkylating a polyol and hydrogenating the product.

Various formulations containing diglycidyl ether of 4,4'-isopropylidenediphenol are made up as reported in the table, below, to illustrate the invention. Three drops of silicone fluid are added to each formulation to prevent formation of voids and bubbles. After degassing under vacuum, the formulations are oven cured in aluminum molds. The cured products are subjected to standard American Society for Testing Materials (ASTM) tests for flexural strength and modulus of elasticity in flexure (ASTM Designation D 790-66), tensile strength and elongation at break (ASTM Designation D 638-64T), deflection temperature (ASTM Designation D 648-56) and hardness (ASTM Designation D 1706). The abbreviations in the table, T., p.b.w., p.s.i., and g. stand for temperature, parts by weight, pounds per square inch, and grams, respectively. The table also illustrates in Formulation 6 that known strong amine curing agents like dimethylaminopropylamine in combination with a mixture of epoxy resin and polyoxyalkylenediamine produce cured resins too weak to test.

of 40. It was also tested for flexibility and adhesion by a Gardner impact tester (Gardner and Sward, Paint Testing Manual, 12th edition, Gardner Laboratory, Inc., Bethesda, Md., 1962). The panel withstood a shock of 160 in.-lb. of reverse impact without visible damage to the coating. An identical test was made concurrently, with the exception that 17 grams of polyoxypropylenediamine 400 was used and the 2,4-dimethylimidazoline was omitted from the formulation. This coating attained a Seward hardness of only 20 in the same period of time.

TABLE I

| Formulation | P.b.w. | Curing conditions | | Flexural strength, p.s.i. | Modulus, p.s.i. | Tensile strength, p.s.i. | Ultimate elongation, percent | Deflection temperature, °C. | | Hardness (Shore D or Shore A2) |
|---|---|---|---|---|---|---|---|---|---|---|
| | | Time, hr. | T., °C. | | | | | 264 g. load | 66 g. load | |
| 1 Polyepoxide | 150 | 15 | 145 | 12,900 | 4.1×10⁵ | 8,300 | 3 | 49 | 51 | 82(D) |
| Polyoxypropylenediamine 400 | 90 | | | | | | | | | |
| 2 Polyepoxide | 120 | 2 | 125 | 16,200 | 4.6×10⁵ | 10,300 | 11 | 52 | 62 | 85(D) |
| Polyoxypropylenediamine 400 | 54 | | | | | | | | | |
| 2,4-dimethylimidazoline | 13 | | | | | | | | | |
| 3 Polyepoxide | 80 | 21 | 100 | | | 271 | 51 | | | 54(A₂) |
| Polyoxypropylenediamine 1000 | 104 | | | | | | | | | |
| 4 Polyepoxide | 100 | 2 | 125 | | | 3,280 | 115 | | | 73(D) |
| Polyoxypropylenediamine 1000 | 68 | | | | | | | | | |
| 2-phenyl 1,4,5,6-tetrahydropyrimidine | 25 | | | | | | | | | |
| 5 Polyepoxide | 146 | 2 | 125 | | | 2,280 | 100 | | | 62(D) |
| Polyoxypropylenediamine 1000 | 100 | | | | | | | | | |
| 2-methyl-1,4,5,6-tetrahydropyrimidine | 20 | | | | | | | | | |
| 6 Polyepoxide | 108 | 2 | 125 | (Product opaque and chessy—too weak to test) | | | | | | |
| Polyoxypropylenediamine 1000 | 75 | | | | | | | | | |
| Dimethylaminopropylamine | 15 | | | | | | | | | |

The data for Formulation 2 of the table illustrate that when 2,4-dimethylimidazoline is combined with a mixture of epoxy resin-polyoxypropylenediamine 400, the curing time is reduced to about 0.15 the time the mixture requires for curing, and the ultimate elongation of the combination containing 2,4-dimethylimidazoline is improved threefold. Formulation 1 of the table is the mixture of epoxy resin—polyoxypropylenediamine 400.

When 2-phenyl-1,4,5,6-tetrahydropyrimidine (Formulation 4 of the table) or 2-methyl-1,4,5,6-tetrahydropyrimidine (Formulation 5 of the table) is combined with a mixture of epoxy resin—polyoxypropylenediamine 1000, the curing time is reduced to about 0.1 the time the mixture requires for curing, and the ultimate elongation of each combination is improved twofold. The mixture of epoxy resin—polyoxypropylenediamine 1000 is shown in Formulation 3.

To test the cyclic amidines alone with epoxy resins, 186 g. epoxy resin and 54 g. 2-methyl-1,4,5,6-tetrahydropyrimidine were stirred together for two minutes on a steam bath to dissolve the solid amidine. Within 30 seconds after complete solution was obtained, the mixture gelled with great evolution of heat, accompanied by thermal decomposition of the mixture. This experiment illustrates that a cyclic amidine of this invention is not a suitable sole curing agent for epoxy resins.

The epoxy resins of our invention are useful as coatings for steel, aluminum, wood, concrete or other materials. For example, a solventless clear epoxy resin coating composition was prepared by mixing together 25 grams diglycidyl ether of isopropylidenediphenol having an epoxy equivalent weight of 180, 15 grams polyoxypropylenediamine 400, 1 gram 2,4-dimthylimidazoline, and 0.5 gram silicone-type flow control agent. The composition was spread on a cold-rolled steel test panel with a 3-mil applicator blade and allowed to harden at an ambient temperature of about 25° C. The coating was dry to handle after standing overnight. After four days, it was tested for hardness with a Sward hardness tester by the American Society for Testing Materials method D 2134-66, showing a Sward hardness rating As further example of the utility of the epoxy resins of our invention, the epoxy resin of Formulation 5 of the table, above, was mixed with 6.8% by weight of silica as a thickening agent and the mixture was spread on the rim of an aluminum mold used for shaping and curing polyurethane foam. When cured for one hour with heat from an infrared lamp, the epoxy resin composition formed a gasket for the mold which served for more than 100 molding cycles with no visible signs of deterioration.

Comparable results to those in the table and examples, above, are obtained with other combinations of polyepoxides, cyclic amidines and polyoxyalkylenepolyamines of this invention not illustrated.

The amounts of polyoxyalkylenepolyamine and cyclic amidine relative to each other and to the polyepoxide may vary considerably without departing from the scope of the invention. However, for the preferred embodiment of the invention, the total number of equivalents of polyoxyalkylenepolyamine and cyclic amidine combined should lie within the range from about 0.75 to about 1.5 times the number of equivalents of epoxide present in the curable epoxy resin composition, and the number of equivalents furnished by the polyoxyalkylenepolyamine should lie in the range from about 50 to 95 percent of the total number of equivalents furnished by the polyoxyalkylenepolyamine and the cyclic amidine combined. Or, the number of equivalents furnished by the amidine should lie in the range from about 5 to 50 percent of the total number of equivalents furnished by the polyoxyalkylenepolyamine and the cyclic amidine combined. For purposes of calculation, the equivalents of polyoxyalkylenepolyamine are equal to the moles of polyoxyalkylenepolyamine multiplied by twice the number of amino groups in the polyoxyalkylenepolyamine, and the equivalents of cyclic amidine equal to the moles of cyclic amidine multiplied by two. The bifunctionality of cyclic amidines unsubsttuted in the 1 position can be deduced from the discovery of Feinauer [Angewandte Chemie, Int. Ed. Engl. 5, 894 (1966)] that epoxides can add to the double bond of an imidazoline ring.

What is claimed is:
1. A method for curing a vicinal epoxy resin having an epoxy equivalency greater than 1 which comprises:
combining with a vicinal polyepoxy (1) a cyclic amidine of the formula:

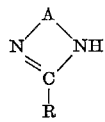

where R is hydrogen, alkyl of 1 to 20 carbon atoms, aryl, aralkyl, alkaryl, or cycloalkyl of 3 to 8 carbon atoms, and A is an alkylene group completing a five or six-membered ring and (2) a polyoxyalkylene polyamine and heating the composition to a curing temperature.

2. A method as in claim 1 wherein total number of equivalents of cyclic amidine and polyoxyalkylenepolyamine combined is within the range from about 0.75 to about 1.5 times the number of equivalents of epoxide present in the curable epoxy resin composition.

3. A method as in claim 2 wherein the number of equivalents furnished by the amidine is within the range from about 5 to about 50 percent of the total number of equivalents furnished by the polyoxyalkylenepolyamine and the amidine combined.

4. A method as in claim 3 wherein R of the cyclic amidine formula is hydrogen, alkyl of 1 to 5 carbon atoms, or phenyl.

5. A method as in claim 3 wherein the cyclic amidine is 2,4-dimethylimidazoline, 2 - phenyl-1,4,5,6-tetrahydropyrimidine, or 2-methyl-1,4,5,6-tetrahydropyrimidine.

6. A curable vicinal epoxy resin composition which comprises:
a vicinal polyepoxide,
a cyclic amidine of the formula:

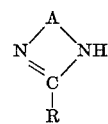

where R is hydrogen, alkyl of 1 to 20 carbon atoms, aryl, aralkyl, alkaryl, or cycloalkyl of 3 to 8 carbon atoms, and A is an alkylene group completing a five or six-membered ring and a polyoxyalkylenepolyamine.

7. An epoxy resin composition as in claim 6 wherein the total number of equivalents of cyclic amidine and polyoxyalkylenepolyamine combined is within the range from about 0.75 to about 1.5 times the number of equivalents of the epoxide present.

8. An epoxy resin composition as in claim 7 wherein the number of equivalents furnished by the amidine is within the range from about 5 to about 50 percent of the total number of equivalents furnished by the polyoxyalkylenepolyamine and the amidine combined.

9. A curable epoxy resin composition as in claim 8 wherein R of the cyclic amidine formula is hydrogen, alkyl of 1 to 5 carbon atoms or phenyl.

10. A curable epoxy resin composition as in claim 8 wherein the cyclic amidine is 2,4-dimethylamidazoline, 2-phenyl-1,4,5,6-tetrahydropyrimidine, or 2-methyl-1,4,5,6-tetrahydropyrimidine.

References Cited
UNITED STATES PATENTS 3,324,050   6/1967   Joo et al. _____ 260—2

FOREIGN PATENTS 929,397   6/1963   Great Britain.

WILLIAM SHORT, Primary Examiner

E. A. NIELSEN, Assistant Examiner

U.S. Cl. X.R.

260—2

UNITED STATES PATENT OFFICE

CERTIFICATE OF CORRECTION

Patent No. 3,549,592  Dated December 22, 1970

Norman Bell Godfrey and Heinz Schulze
Assignors to Jefferson Chemical Company, Inc.
Houston, Texas, a corporation of Delaware It is certified that errors appear in the above-identified patent and that Letters Patent are hereby corrected as shown below:

In column 1, line 47, "pages" should read -- page --
In column 4, line 10, "Seward" should read -- Sward --; in column 4, line 35, after "As" -- a -- should be added; and in column 4, line 72, "unsubsttuted" should read -- unsubstituted
In column 5, line 4, "polyepoxy" should read -- polyepoxide --

Signed and sealed this 18th day of May 1971.

(SEAL)
Attest:

EDWARD M. FLETCHER, JR.
Attesting Officer

WILLIAM E. SCHUYLER,
Commissioner of Pate